(12) United States Patent
Su et al.

(10) Patent No.: US 10,573,403 B2
(45) Date of Patent: Feb. 25, 2020

(54) WATER JETS CUTTING MACHINE

(71) Applicant: Gongin Precision Industries Co., Ltd., Kaohsiung (TW)

(72) Inventors: Yo-Hsin Su, Kaohsiung (TW); Pin-Tsung Cheng, Kaohsiung (TW)

(73) Assignee: GONGIN PRECISION INDUSTRIES CO., LTD., Kaohsiung (TW)

( * ) Notice: Subject to any disclaimer, the term of this patent is extended or adjusted under 35 U.S.C. 154(b) by 132 days.

(21) Appl. No.: 15/869,750

(22) Filed: Jan. 12, 2018

(65) Prior Publication Data

US 2018/0350448 A1  Dec. 6, 2018

(30) Foreign Application Priority Data

Jun. 3, 2017  (TW) .............................. 106118376 A

(51) Int. Cl.
  *G12B 5/00* (2006.01)
  *B26F 3/00* (2006.01)
  (Continued)

(52) U.S. Cl.
  CPC .................. *G12B 5/00* (2013.01); *B24C 3/02* (2013.01); *B24C 5/02* (2013.01); *B24C 9/00* (2013.01);
  (Continued)

(58) Field of Classification Search
  CPC ........... Y10T 83/364; B24C 3/00; B24C 3/02; B24C 3/04; B24C 3/06; B24C 5/02;
  (Continued)

(56) References Cited

U.S. PATENT DOCUMENTS 1,327,630 A    1/1920  Gaston
8,401,692 B2   3/2013  Knaupp et al.
          (Continued)

FOREIGN PATENT DOCUMENTS

EP    2308645 A1     4/2011
EP    2397286 A2 *  12/2011  ............. B24C 1/045
          (Continued)

OTHER PUBLICATIONS

Machine Design, Spherical Bearings, 2002, retreived from https://www.machinedesign.com/basics-design/spherical-bearings on Jul. 17, 2019 (Year: 2002).*
          (Continued)

*Primary Examiner* — Evan H MacFarlane
(74) *Attorney, Agent, or Firm* — Fox Rothschild LLP; Robert J. Sacco; Carol E. Thorstad-Forsyth

(57) ABSTRACT

A water jets cutting machine includes a first rotating seat driven by a first motor to rotate about a first rotation axis, a second rotating seat driven by a second motor to rotate about a second axis, a water jets cutting head, an inertial measurement unit (IMU) for detecting an inclination angle of the water jets cutting head, and a controller connecting the first and second motors and the IMU. The controller is able to control the first and second motors to instantaneously conduct compensation for angular deviation of the water jets cutting head according to attitude and position signals which are fed back to the controller by the IMU.

6 Claims, 5 Drawing Sheets

(51) Int. Cl.
*B24C 5/02* (2006.01)
*B24C 3/02* (2006.01)
*B24C 9/00* (2006.01)
*B26F 1/38* (2006.01)
*G02B 7/00* (2006.01)
*B23Q 1/01* (2006.01)
*B23Q 1/64* (2006.01)

(52) U.S. Cl.
CPC ............ *B26F 1/3806* (2013.01); *B26F 3/004* (2013.01); *G02B 7/005* (2013.01); *B23Q 1/012* (2013.01); *B23Q 1/64* (2013.01); *G05B 2219/45036* (2013.01)

(58) Field of Classification Search
CPC .......... B24C 1/045; B26F 3/004; B26F 3/008; B26F 2003/006; B26F 1/3806; G12B 5/00; G02B 7/005; B23Q 1/012; B23Q 1/64; G05B 2219/45036
USPC .......................... 83/177; 451/102, 91, 92, 38
See application file for complete search history.

(56) References Cited

U.S. PATENT DOCUMENTS

| | | | | |
|---|---|---|---|---|
| 8,425,280 B2 * | 4/2013 | Siepi | ............. | B24C 5/02 451/101 |
| 9,067,331 B2 * | 6/2015 | Stang | ............. | B26F 3/004 |
| 10,343,259 B2 * | 7/2019 | Traini | ............. | B24C 5/04 |
| 2002/0066345 A1 * | 6/2002 | Shepherd | ............. | B24C 1/045 83/53 |
| 2010/0173570 A1 * | 7/2010 | Reukers | ............. | B24C 1/045 451/91 |
| 2013/0025422 A1 * | 1/2013 | Chillman | ............. | B24C 1/045 83/53 |
| 2016/0059384 A1 * | 3/2016 | Niblock | ............. | B24C 1/045 451/40 |
| 2016/0129515 A1 * | 5/2016 | Phillip | ............. | B23K 10/00 219/121.44 |
| 2016/0193679 A1 | 7/2016 | Zhang et al. | | |
| 2017/0113324 A1 * | 4/2017 | Romanoff | ............. | B24C 1/045 |
| 2017/0259400 A1 * | 9/2017 | Orlandi | ............. | B24C 7/003 |

FOREIGN PATENT DOCUMENTS

WO 2010092196 A2 8/2010
WO WO-2015124991 A1 * 8/2015 ........... B23K 26/702

OTHER PUBLICATIONS

Office Action issued to Korean counterpart application No. 10-2018-0010715 by the KIPO dated Jun. 11, 2019, with an English translation thereof.
Search Report issued to European counterpart application No. 18153930.5 by the EPO dated Aug. 17, 2018.
Examination Report issued to Australian counterpart application No. 2018200430 by the IP Australia dated Feb. 6, 2019.

* cited by examiner

WATER JETS CUTTING MACHINE

CROSS-REFERENCE TO RELATED APPLICATION

This application claims priority of Taiwanese patent application No. 106118376, filed on Jun. 3, 2017.

FIELD

The disclosure relates to a water jets cutting machine, and more particularly to a water jets cutting machine that includes an inertial measurement unit.

BACKGROUND

As shown in FIG. 1, a conventional water jets cutting machine 1 includes a first rotating seat 11, a second rotating seat 12 rotatably connected to the first rotating seat 11, and a water jets cutting head 13 disposed on the second rotating seat 12. The first rotating seat 11 is driven by a first motor 14 to rotate about a first rotation axis (A). The second rotating seat 12 is driven by a second motor 15 to rotate about a second rotation axis (B). The first and second rotation axes (A, B) intersect each other and form an included angle therebetween. The water jets cutting head 13 is moved by the first and second rotating seats 11, 12 to be tilted to an inclination angle relative to the first rotation axis (A) for processing and producing a beveled surface.

However, during a cutting operation, factors, such as the positioning accuracy of the connecting mechanism of the first and second motors 14, 15, the material of abrasive particles, conditions of water jets devices, water jets head moving conditions, materials of machining parts and work pieces, etc., may affect the position of the water jets cutting head 13 so that the inclination angle of the water jets cutting head 13 is deviated from a assumed predetermined angle, thereby losing machining accuracy. Because the conventional water jets cutting machine 1 operates at a high cutting speed, flatness of the cut surface and/or perpendicularity between two planes are liable to fall out of an acceptable tolerance range, thus lowering accuracy of product quality.

SUMMARY

Therefore, an object of the disclosure is to provide a water jets cutting machine that can alleviate at least one of the drawbacks of the prior art.

According to the present disclosure, the water jets cutting machine includes a carriage unit, a water jets unit and a CNC controller.

The carriage unit includes a base, a first motor, a first rotating seat and a second motor and a second rotating seat. The first motor is disposed on the base. The first rotating seat is connected to and driven by the first motor, and is rotatable about a first rotation axis. The second motor is disposed on the first rotating seat. The second rotating seat is connected to and driven by the second motor, and is rotatable about a second rotation axis. The first rotation axis and the second rotation axis form an included angle therebetween.

The water jets unit includes a pneumatic valve, a water jets cutting head and an inertial measurement unit (IMU). The pneumatic valve is disposed on the second rotating seat. The water jets cutting head is connected to the pneumatic valve. The IMU is to detect an inclination angle of a tool center point of the water jets cutting head.

The CNC controller connects the first and second motors and the IMU, and is able to control the first and second motors to instantaneously conduct compensation for angular deviation of the water jets cutting head according to attitude and position signals which are fed back to the controller by the IMU.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
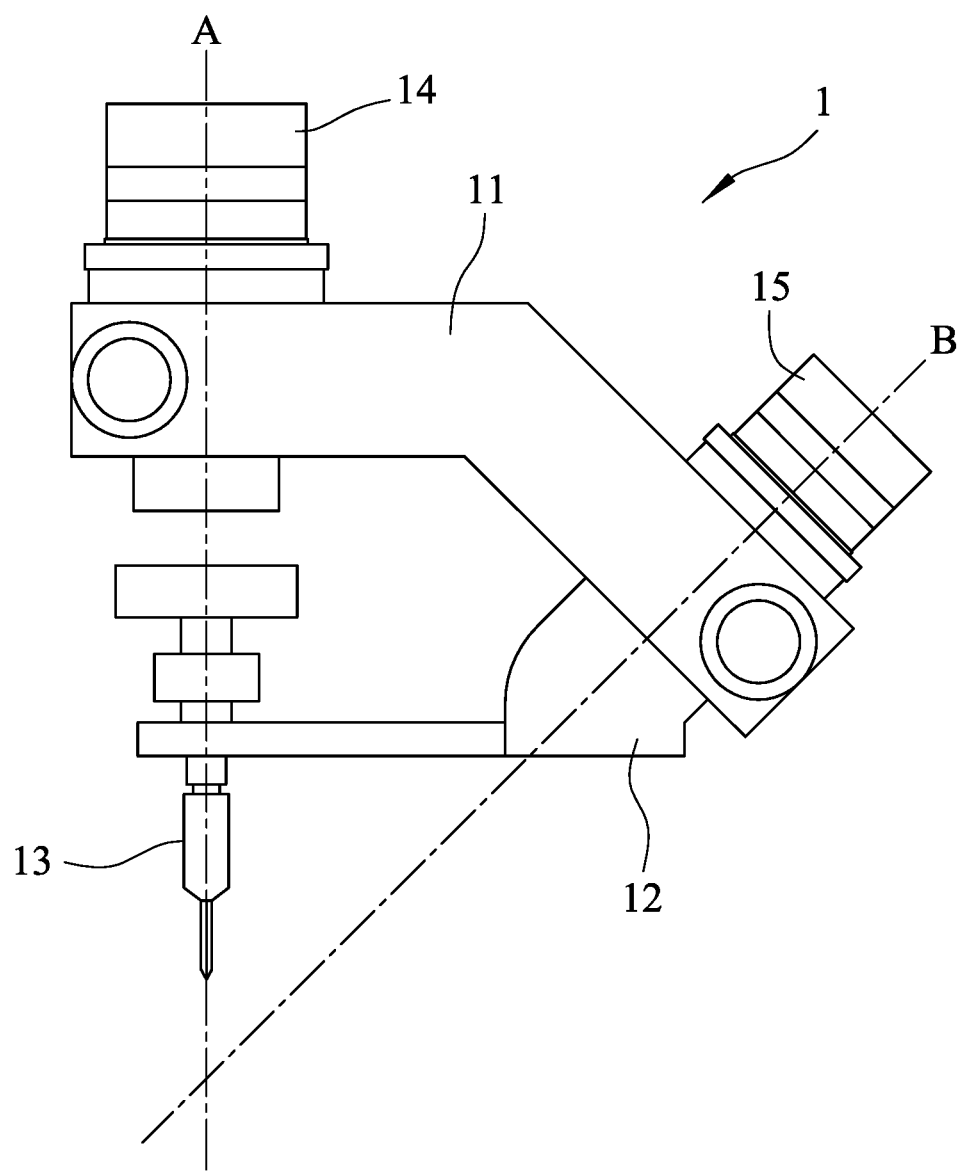
FIG. 1 illustrates a conventional water jets cutting machine.
Figure 2:
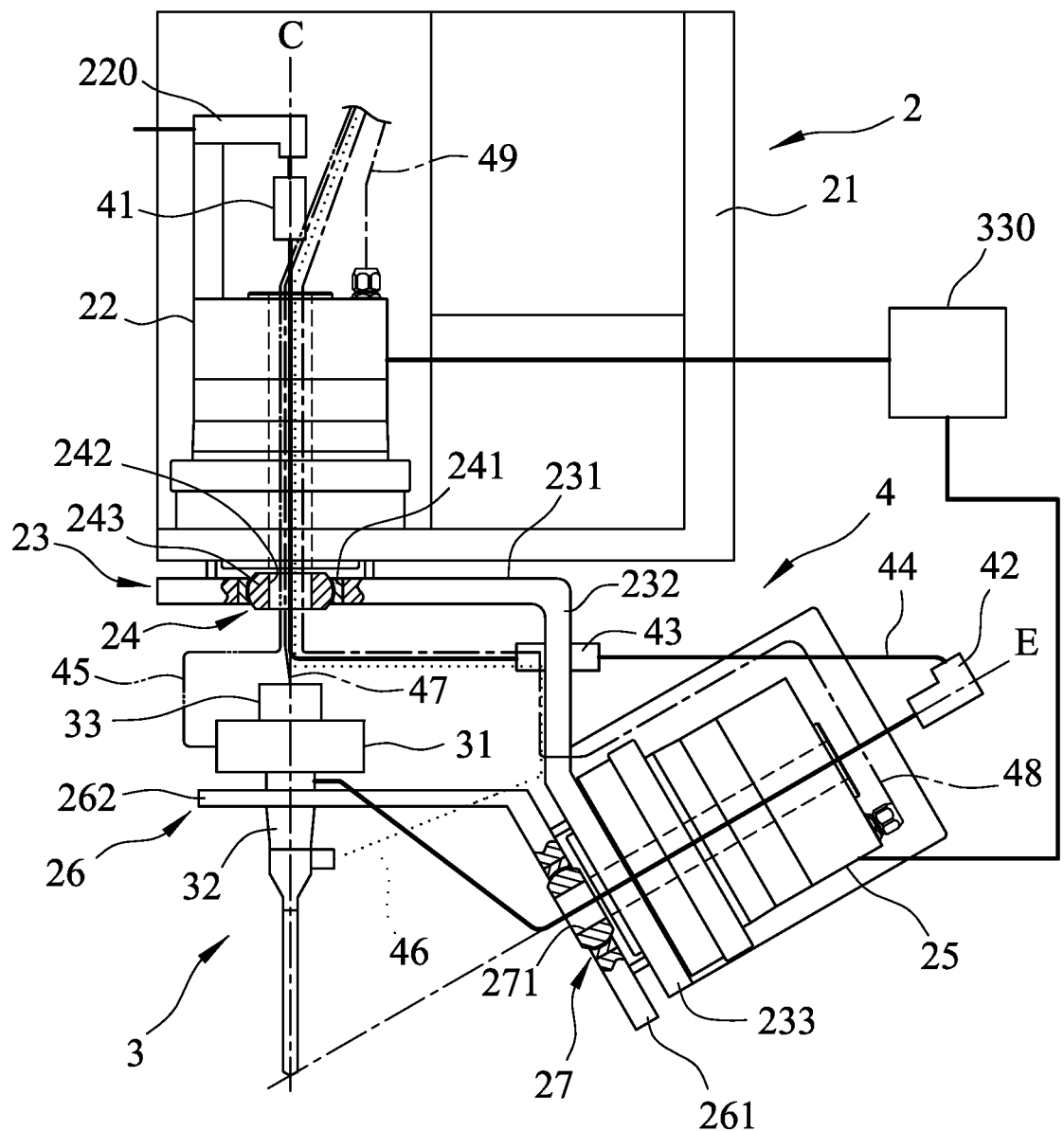
FIG. 2 illustrates a water jets cutting machine according to an embodiment of the present disclosure.
Figure 3:
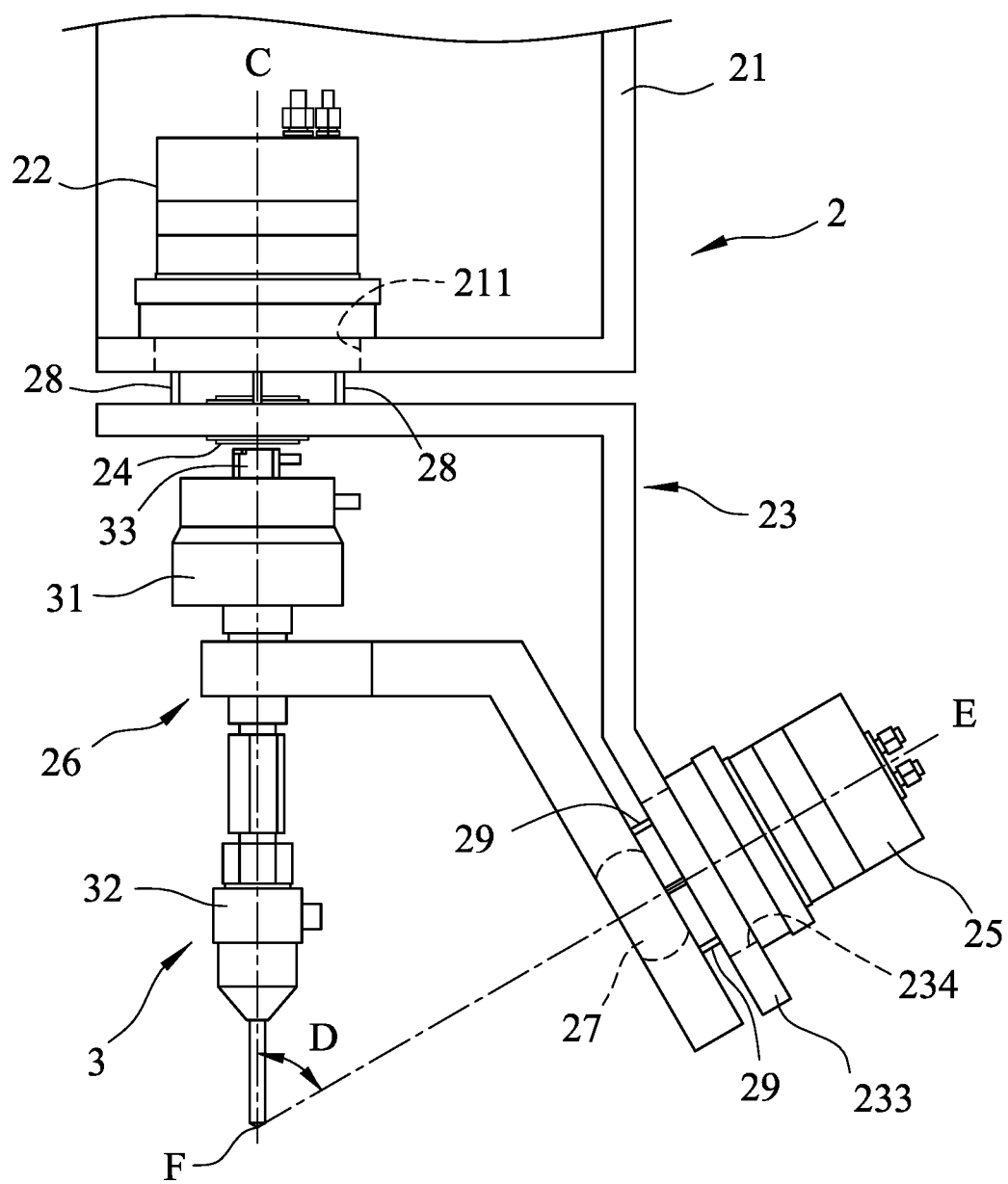
FIG. 3 is a fragmentary view of the embodiment.

Referring to FIGS. 2 and 3, a water jets cutting machine according to an embodiment of the present disclosure includes a carriage unit 2, a water jets unit 3, a CNC controller 330 and a pipeline and wiring unit 4.

The carriage unit 2 includes a base 21, a first motor 22 disposed on the base 21, a first rotating seat 23 connected to and driven by the first motor 22, a first ball joint 24 disposed on the first rotating seat 23, a second motor 25 disposed on the first rotating seat 23, a second rotating seat 26 connected to and driven by the second motor 25, and a second ball joint 27 disposed on the second rotating seat 26. In this embodiment, each of the first and second ball joint 24, 27 is a spherical bearing. In other embodiments, the second ball joint 27 may be a single row deep groove ball bearing according to the requirements of practical application.

The base 21 has an open recess 211 through which the first motor 22 partly extends and is connected to the first rotating seat 23 by a plurality of couplings 28. The first rotating seat 23 has an installing portion 231, and an extension portion 232 and an inclination portion 233. The installing portion 231 is parallel with the base 21, and permits installation of the first ball joint 24 in connection with the first motor 22. The extension portion 232 extends downwardly from an end of the installing portion 231. The inclination portion 233 extends and inclines downwardly from a bottom end of the extension portion 232, and allows installation of the second motor 25. The inclination portion 233 has an open recess 234 through which the second motor 25 partly extends and is connected to the second rotating seat 26 by a plurality of fasteners 29. A first rotation axis (C) extends through centers of the first motor 22 and the first ball joint 24. The first ball joint 24 has an outer ring 241 fixed on the installing portion 231 of the first rotating seat 23, and an inner ring 243 rotatably disposed in the outer ring 241 and having a first through hole 242. The inner ring 243 is rotatable relative to the outer ring 241 and about the same axis as the outer ring 241. In addition, the inner ring 243 may be inclined with respect to the outer ring 241.

The second rotating seat 26 has a sloping portion 261 and a planar portion 262. The sloping portion 261 is parallel with the inclination portion 233 and connected to the second motor 25. The planar portion 262 is connected to a top end of the sloping portion 261 and parallel with the installing portion 231. A second rotation axis (E) extends through centers of the second motor 25 and the second ball joint 27. The first rotation axis (C) and the second rotation axis (E) form an included angle (D) therebetween, and intersect each other at an intersecting point (F). In this embodiment, the included angle (D) is 60 degrees. The second ball joint 27 has a second through hole 271 opening toward the inclination portion 233. The first and second motors 22, 25 are harmonic servomotors in this embodiment.

The water jets unit 3 includes a pneumatic valve 31, a water jets cutting head 32 and an inertial measurement unit (IMU) 33. The pneumatic valve 31 is disposed on the planar portion 262 of the second rotating seat 26. The water jets cutting head 32 is disposed on the planar portion 262 of the second rotating seat 26 and is connected fluidly to the pneumatic valve 31. The IMU 33 is disposed on the pneumatic valve 31, but is not limited thereto. The CNC controller 330 connects the first and second motors 22, 25 and the IMU 33 and so on. The water jets cutting head 32 has a tip located at the intersecting point (F, i.e., Tool Center Point). The CNC controller 330 is able to control the first and second motors 22, 25 to instantaneously conduct compensation for angular deviation of the water jets cutting head 32 according to attitude and position signals, which are fed back to the CNC controller by the IMU 33.

The pipeline and wiring unit 4 includes a first rotary connector 41, a second rotary connector 42, an adaptor 43, a high pressure water inlet pipe 44, an air inlet pipe 45, an abrasive supply pipe 46, a first electric wire 47, a second electric wire 48 and a third electric wire 49. The first rotary connector 41 is disposed on the first motor 22 by being attached to a support frame 220 mounted on the first motor 22, is rotatable relative to the first motor 22 and about the first rotation axis (C), and is a substantially I-shaped swivel adapter. The second rotary connector 42 is disposed on the second motor 25 through a support frame (not shown) mounted on the second motor 25, is rotatable relative to the second motor 25 and about the second rotation axis (E), and is a substantially L-shaped swivel adapter. The adaptor 43 extends horizontally through and is attached to the extension portion 232 of the first rotating seat 23. The high pressure water inlet pipe 44 is connected fluidly to the water jets cutting head 32. The air inlet pipe 45 is connected fluidly to the pneumatic valve 31. The abrasive supply pipe 46 is connected fluidly to the water jets cutting head 32. The first electric wire 47 electrically connects the IMU 33. The second electric wire 48 is connected electrically to the second motor 25. The third electric wire 49 electrically connects the first motor 22, the first electric wire 47 and the second electric wire 48. In order to simplify the drawings, the pipeline and wiring unit 4 is shown only in FIG. 2 using a thick solid line to represent the high pressure water inlet pipe 44, a dotted and dashed line to represent the air inlet pipe 45, and a dotted line to represent the abrasive supply pipe 46. The first, second and third electric wires 47, 48, 49 are represented by phantom lines. As shown in FIG. 2, the high pressure water inlet pipe 44 extends consecutively through the first rotary connector 41, the first motor 22, the first through hole 242 of the first ball joint 24, the adaptor 43, the second rotary connector 42, the second motor 25 and the second through hole 271 of the second ball joint 27, and connects the water jets cutting head 32. The air inlet pipe 45 extends consecutively through the first motor 22 and the first through hole 242 of the first ball joint 24, and then connects the pneumatic valve 31. The abrasive supply pipe 46 extends consecutively through the first motor 22 and the first through hole 242 of the first ball joint 24, and then connects the water jets cutting head 32. The first electric wire 47 extends consecutively through the first motor 22 and the first through hole 242, and then connects the IMU 33. The second electric wire 48 extends consecutively through the first motor 22 and the first through hole 242 of the first ball joint 24, extends past the extension portion 232 of the first rotating seat 23, and connects the second motor 25.

When the first motor 22 drives the first rotating seat 23 to rotate about the first rotation axis (C), the first rotating seat 23 will bring the second rotating seat 26 to rotate. When the second motor 25 drives the second rotating seat 26 to rotate about the second rotation axis (E), the second rotating seat 26 will cause the water jets cutting heat 32 to tilt to an angle relative to the first rotation axis (C). During the operation, the IMU 33, the pneumatic valve 31, the water jets cutting head 32 and the second rotating seat 26 simultaneously rotate and turn.

In this embodiment, the IMU 33 may include a combination of gyroscopes, accelerometers, magnetometers and optionally other functional units. The IMU is capable of three-axis attitude detection to monitor whether or not the water jets cutting head 32 is kept at an appropriate inclination angle. The CNC controller 330 controls the activities of the first and second motors 22, 25 so that the water jets cutting head 32 is able to conduct a cutting operation at a correct inclination angle. In addition, the IMU 33 must be used to adjust the water jets cutting head 32 based on a predetermined compensation angle value which is optimized for particular processing conditions and activities. For example, when the cutting speed is high, the cut surface may be easily formed with a wavy taper surface, resulting in surface unevenness, or causing perpendicularity between two planes to fall out of an acceptable tolerance range. According to this embodiment, a reference chart may be established beforehand including a list of predetermined compensation angle values associated with factors, such as different cutting speeds, different workpiece thickness, different abrasive flow rates, etc. Based on parameters, such as the cutting speed, workpiece thickness, different abrasive flow rates, etc, the IMU 33 can create an optimized compensation angle for eliminating the waviness and taper surface so that machining accuracy can be enhanced and flatness and perpendicularity can fall within the acceptable tolerance range.

Figure 4:
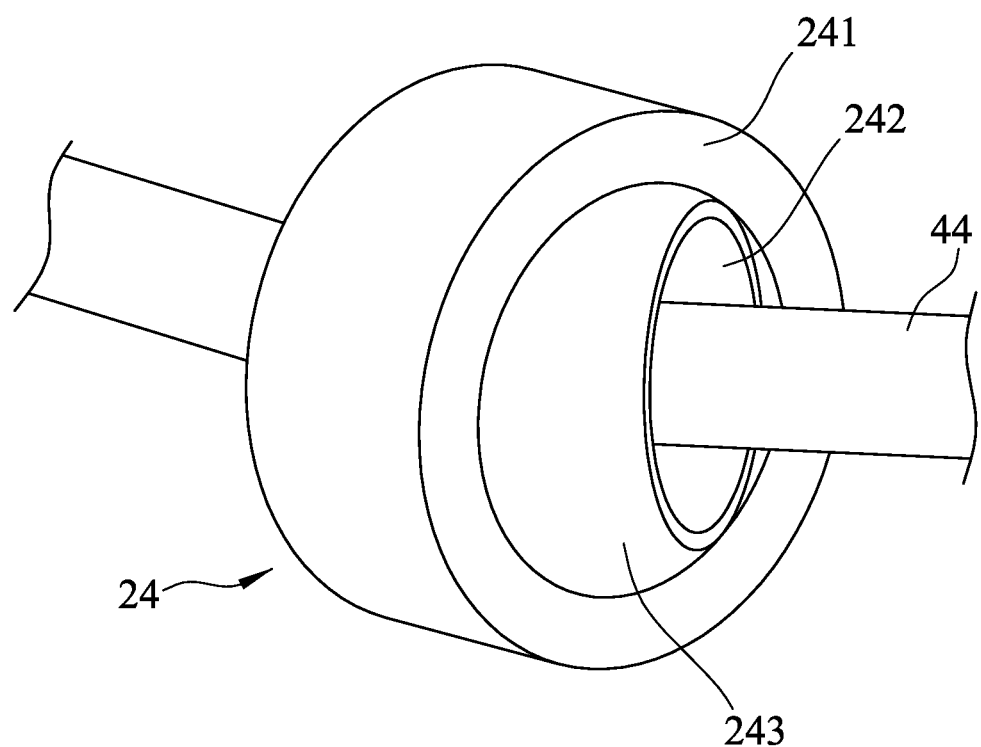
FIG. 4 is a perspective view illustrating a ball joint and a high pressure water inlet pipe of the water jets cutting machine.

Referring to FIG. 4, in combination with FIGS. 2 and 3, to sustain high water pressure, the high pressure water inlet pipe 44 is a specialized rigid pipe made from a metal material. If the high pressure water inlet pipe 44 is used in a conventional water jets cutting machine, rotating and turning movements during a machining operation will cause repeated bending and twisting of the high pressure water inlet pipe 44 and produce surface stresses. A plurality of reverse curvatures will be formed on the high pressure water inlet pipe 44, which will impede the inlet flow in the high pressure water inlet pipe 44. Further, due to stress concentration and pulsed pressure, the high pressure water inlet pipe 44 will be prone to fatigue and damage. This problem may be avoided in this embodiment. The first and second rotary connector 41, 42 are respectively rotatable about the first and second rotation axes (C, E), and are able to prevent the high pressure water inlet pipe 44 from being twisted and damaged due to insufficient degrees of freedom for rotation. Because the inner ring 243 of the first ball joint 24 is slightly rotatable relative to the outer ring 241, the first ball joint 24 allows the high pressure water inlet pipe 44 to make slight angular movement. This arrangement may absorb part of stresses imposed on the high pressure water inlet pipe 44, thereby enhancing durability of the high pressure water inlet pipe 44. Similarly, the second ball joint 27 can achieve the same effect as the first ball joint 24. On the other hand, the air inlet pipe 45, the abrasive supply pipe 46, the first electric wire 47, the second electric wire 48 and the third electric wire 49, which are soft and flexible, are rotatable about or together with the high pressure water inlet pipe 44. When rotation of the air inlet pipe 45, the abrasive supply pipe 46, the first electric wire 47, the second electric wire 48 and the third electric wire 49 reaches an extreme limit, the direction of the rotation may be reversed. Reversal of the rotation direction may be repeated through control of the CNC controller 330.

It is worth mentioning that this embodiment may achieve a static positioning accuracy of the water jets head 32, which ranges from 0.0001 degrees to 0.1 degrees and a dynamic positioning accuracy which ranges from 0.001 degrees to 0.05 degrees. Table 1 shows a comparison of the static positioning accuracy level achieved by the water jets cutting machine of the present disclosure with those achieved by the exiting known cutting machines manufactured by well-known manufacturing companies. Table 2 shows a comparison of the dynamic positioning accuracy level achieved by the water jets cutting machine of the present disclosure with that achieved by an exiting known cutting machine manufactured by Water Jet Sweden Company.

TABLE 1

| Company Name | Static positioning accuracy |
|---|---|
| The present disclosure | 0.0001°~0.1° |
| WARDJET | 0.0167° (1 arcmin) |
| OMAX | 0.09° (6 arcmin) |
| Resato | 0.1° |

TABLE 2

| Company Name | Dynamic positioning accuracy |
|---|---|
| The present disclosure | 0.001°~0.05° |
| WaterJetSweden | 0.0167° (1 arcmin) |

Figure 5:
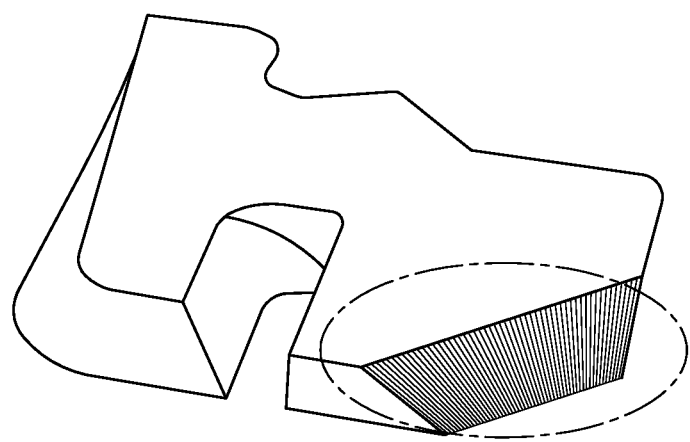
FIG. 5 illustrates characteristics of a cut surface of a workpiece processed by a known water jets cutting machine manufactured by Water Jet Sweden Company.

FIG. 5 shows a finished product processed by a 2.5D water jets cutting machine manufactured by Water Jet Sweden Company. Although the cut surface (see the encircled area) of the product is considerably acceptable, the 2.5D water jets cutting machine of Water Jet Sweden is unable to compensate angular deviation for enhancement of machining quality.

To sum up, the IMU 33 is advantageous for correcting the attitude and position and compensating angular deviation of the water jets cutting head 32. The first and second ball joints 24, 27 can reduce impact forces and partially absorb stresses imposed on the high pressure water inlet pipe 44, thus enhancing the durability of the high pressure water inlet pipe 44.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A water jets cutting machine, comprising:
   a carriage unit including
   a base,
   a first motor disposed on said base,
   a first rotating seat connected to and driven by said first motor, said first rotating seat being rotatable about a first rotation axis,
   a second motor disposed on said first rotating seat, and
   a second rotating seat connected to and driven by said second motor, said second rotating seat being rotatable about a second rotation axis, said first rotation axis and said second rotation axis forming an included angle therebetween; and
   a water jets unit including
   a pneumatic valve disposed on said second rotating seat,
   a water jets cutting head connected fluidly to said pneumatic valve, and
   an inertial measurement unit (IMU) for detecting an inclination angle of said water jets cutting head; and
   a controller connecting said first and second motors and said IMU,
   wherein said controller is able to control said first and second motors to conduct compensation for angular deviation of said water jets cutting head according to attitude and position signals which are fed back to said controller by said IMU;
   wherein said carriage unit further includes a first ball joint disposed on said first rotating seat, said first ball joint having a first through hole, said first ball joint being a spherical bearing;
   wherein the water jets cutting machine further comprises a pipeline and wiring unit which includes a pressurized water inlet pipe extending through said first through hole and connected to said water jets cutting head, an air inlet pipe extending through said first through hole and connected fluidly to said pneumatic valve, and an abrasive supply pipe extending through said first through hole and connected fluidly to said water jets cutting head;
   wherein said carriage unit further includes a second ball joint disposed on said second rotating seat and having a second through hole, said second ball joint being a spherical bearing, and said pressurized water inlet pipe extends consecutively through said first motor, said first through hole of said first ball joint, said first rotating seat, said second motor and said second through hole of said second ball joint.

2. The water jets cutting machine as claimed in claim 1, wherein said first ball joint has an outer ring fixed on said first rotating seat, and an inner ring rotatably disposed in said outer ring and having said first through hole.

3. The water jets cutting machine as claimed in claim 2, wherein each of said first and second motors is a servomotor.

4. The water jets cutting machine as claimed in claim 1, wherein a dynamic positioning accuracy for said water jets head ranges from 0.001 degrees to 0.05 degrees.

5. The water jets cutting machine as claimed in claim 1, wherein said air inlet pipe extends consecutively through said first motor and said first through hole of said first ball joint, said abrasive supply pipe extending consecutively through said first motor and said first through hole of said first ball joint.

6. The water jets cutting machine as claimed in claim 1, wherein said pipeline and wiring unit further includes a first electric wire, a second electric wire and a third electric wire, said first electric wire extending consecutively through said first motor and said first through hole, said first electric wire connecting to said IMU, said second electric wire extending consecutively through said first motor and said first through hole, said second electric wire extending past said first rotating seat, and said second electric wire being connected to said second motor.

\* \* \* \* \*